United States Patent [19]

Nakano et al.

[11] Patent Number: 5,357,345
[45] Date of Patent: Oct. 18, 1994

[54] FACSIMILE APPARATUS CAPABLE OF SUCCESSIVELY RETRIEVING RELATED IMAGE DATA

[75] Inventors: Yoshiro Nakano; Takashi Takenaka, both of Higashihiroshima, Japan

[73] Assignee: Sharp Kabushiki Kaisha, Osaka, Japan

[21] Appl. No.: 784,515

[22] Filed: Oct. 29, 1991

[30] Foreign Application Priority Data

Oct. 31, 1990 [JP] Japan ................... 2-295686

[51] Int. Cl.$^5$ .................... H04N 1/21; H04N 1/32
[52] U.S. Cl. .................... 358/403; 358/435; 358/437; 358/444
[58] Field of Search ............... 358/403, 407, 439, 440, 358/435, 438, 468, 450, 453, 444, 404, 434, 436, 437, 439; 371/32; 379/100

[56] References Cited

U.S. PATENT DOCUMENTS

| 4,581,656 | 4/1986 | Wada . |
| 4,807,276 | 2/1989 | Okabe . |
| 4,829,524 | 5/1989 | Yoshida .................... 371/32 |
| 4,897,869 | 1/1990 | Takahashi .................... 358/400 |
| 5,068,888 | 11/1991 | Scherk et al. .................... 358/402 |

FOREIGN PATENT DOCUMENTS

| 0193410 | 9/1986 | European Pat. Off. . |
| 0368250 | 5/1990 | European Pat. Off. . |
| 2-72764 | 3/1990 | Japan . |
| 2166620 | 5/1986 | United Kingdom . |

OTHER PUBLICATIONS

"Paging System With Transmission Information Confirming Function", English abstract of Japanese Laid Open Application, 60-220632, Nov. 1985.

*Primary Examiner*—Scott A. Rogers

[57] ABSTRACT

A facsimile apparatus includes a memory wherein data are stored in a sequential manner. The data are input through a network. The facsimile apparatus transmits the image data in the memory to a destination facsimile apparatus through the network in response to a retrieval request signal from the destination facsimile apparatus. When the destination facsimile apparatus performs an operator interruption processing after the transmission, a transmitter again accepts a retrieval request signal from the destination facsimile and transmits image data from the memory.

18 Claims, 7 Drawing Sheets

FACSIMILE APPARATUS CAPABLE OF SUCCESSIVELY RETRIEVING RELATED IMAGE DATA

BACKGROUND OF THE INVENTION

1. Field of the Invention

The present invention relates generally to facsimile apparatuses, and more particularly, to facsimile apparatuses having an image storing function of transmitting stored image data upon a request for data retrieval by a facsimile apparatus provided at a distant place.

2. Description of the Related Art

A facsimile apparatus of interest to the present invention is disclosed for example in Japanese Patent Laying-Open No. 2-72764, laid open Mar. 13, 1990. According to the official gazette of that document, a facsimile apparatus capable of storing received and read image data in an image memory sequentially transmits, as a transmitter, all the stored image data or designated image data, with a destination facsimile apparatus as a receiver, in accordance with the facsimile communication procedure upon a request for image data retrieval by the destination facsimile apparatus.

FIG. 5 shows the procedure of retrieving image data stored in an image storing unit at a request by a facsimile apparatus provided at a distant place. In the following description, a facsimile apparatus having a function of storing image is referred to as a transmission side and a facsimile apparatus at a distant place as a reception side.

First, the reception side calls up the transmission side (S21). The transmission side connects the line to establish a communication line between the transmission side and the reception side by the network. After the line connection by the transmission side, the reception side informs the transmission side of a code number necessary for data retrieval by using a DTMF (Dual Tone Multiple Frequency) signal (S22). The transmission side compares the code number received from the reception side with code numbers registered in its apparatus to prepare for receiving a retrieval request when the code numbers agree with each other. Subsequently to the code number, the reception side informs the transmission side of the retrieval request by using the DTMF signal (S23). The retrieval request usually includes either the information for retrieving all the image data stored in the image storing portion or the information for retrieving designated image data. At the retrieval request, the transmission side exchanges the signals with the reception side for transmitting image data in accordance with the facsimile communication procedure advised by CCITT (International Telegraph and Telephone Consultive Committee) (S24–S35).

More specifically, the transmission side transmits a CNG (Calling) signal (calling tone) indicative of the start of transmission (S24). The signal has a frequency of 1100 Hz and repetitionally turns on for 0.5 sec. and off for 3 sec. The reception side receives the CNG signal to send CED/DIS (Called/Digital Identification) signal (S25). The CED signal has a frequency of 2100 Hz and the duration of about 3 sec., which indicates that the reception side is functioning as a facsimile apparatus. The DIS signal is a binary code signal to be transmitted in a synchronization mode of 306 bps. The DIS signal includes information indicative of the reception capability of the reception side. On receiving the DIS signal, the transmission side sends a DCS (Digital Command Signal) as a binary code signal (S26) to inform the reception side of the transmission system matching the reception capability of the reception side. The transmission side transmits a TCF (Training Check) signal of "0" having a duration of 1.5 sec. at the same speed as the transmission speed (one of 2400, 4800, 7200 and 9600 bps) of the image data for the subsequent image data transmission (S27). When the reception side receives "0" of the TCF signal precisely, it is determined by the transmission side that the image data reception at the present speed involves reduced image data error, thereby sending a CFR (Communication to Receive) signal of a binary code signal (S28). The procedures at S27 and S28 are directed to verifying the quality of the network in use. When "0" can not be precisely received, that is, when the image data can not be received at that speed, the reception side sends an FTT (Failure to Train) signal, a binary code signal indicative of the necessity of communication at a lower transmission speed. Upon the reception of the CFR signal, the transmission side determines that the quality of the network in use is excellent to transmit the image data at the same speed as the TCF signal transmission speed (S29). The reception side prints the image data on recording paper to reproduce the image data. After finishing the transmission of the image data of one page, the transmission side sends an MPS (Multipage Signal) of a binary code signal when having another image data to be subsequently transmitted (S30). Upon the reception of the MPS signal, the reception side sends the binary code MCF signal as a response signal (S31) to proceed to a reception of the subsequent image data. After receiving the MCF signal, the transmission side transmits the subsequent image data (S32) and when finishing the transmission of the image data of one page, sees if there is any image data left to be subsequently transmitted. If there is, the transmission side sends the MPS signal (S30) and if there is no image data, the transmission side sends an EOP (End Of Procedure), a binary code signal indicative of the end of the transmission of the image data (S33). Upon receiving the EOP signal, the reception side sends an MCF (Message Confirmation) signal of a binary code signal as a response signal (S34). On receiving the MCF signal, the transmission side completes the transmission and sends a DCN (Disconnect) signal, binary code signal indicative of the release of the line (S35) to release the line. On receiving the DCN signal, also the reception side release the line to terminate the reception.

The above-described conventional facsimile apparatus, however, has a problem as follows.

In a case an image memory comprising a storage medium having a sequential arrangement and storing other data (for example, sound etc.) than image data (the storage format of the storage medium as shown in FIG. 6), for successively retrieving the image data from the storage medium by the request of retrieving all the image data stored in the image memory, the storage medium should be moved, after transmitting image data N11, to the position of image data N12 by skipping M11 which is a storage area for the data other than image data. This requires a time T for shifting. Image data N12 is transmittable if the shifting time T falls within a period from the end of the image data transmission indicated by S29 to the start of the subsequent image data transmission indicated by S32 in the facsimile communication procedure shown in FIG. 5 and if not, the image data N12 is non-transmittable. A time period from an end of an image data transmission to a start of an MPS transmission and a time period from an MCF reception to a start of a subsequent image data transmission are settled on CCITT standard. The shifting time T exceeding these time periods is regarded as error by a reception side in general. With such recording medium structure as described above, therefore, image data of all the pages can not be successively retrieved.

Such a problem as follows is presented by a request for retrieving designated image data out of image data stored in an image storing portion. While the designated image data is being retrieved, the image data is sequentially printed on recording paper at the reception side. Even if the operator at the reception side judges from the printed image data that related image data should be further retrieved, the facsimile communication procedure shown in FIG. 5 requires another series of operations for retrieving related image data to be performed after once releasing the line, which operations involve a waste of time and cost.

SUMMARY OF THE INVENTION

An object of the present invention is to successively retrieve related image data from a facsimile apparatus after having received the image data from the same, in a facsimile apparatus provided at a distant place.

Another object of the present invention is to successively retrieve related image from a facsimile apparatus having a memory wherein data are stored in a sequential manner in a facsimile apparatus provided at a distant place.

A further object of the present invention is to allow a reception side facsimile apparatus to successively retrieve a predetermined plurality pieces of image information stored in a facsimile apparatus at a transmission side.

Still further object of the present invention is to enable a user of a facsimile apparatus at a reception side, after receiving a part of the data of image information stored in a facsimile apparatus at a transmission side, to successively retrieve the data of the related image information from the transmission side apparatus when the operator needs to successively refer to the related image information.

The above-described objects of the present invention can be achieved by a facsimile apparatus including the following elements. That is, the facsimile apparatus according to the present invention includes an input device for inputting image data, a memory for storing input image data, a transmitter for transmitting the image data of the memory to a line in response to a retrieval request signal from a destination facsimile apparatus and a controller for controlling the transmitter to be ready for receiving a retrieval request through the operator interruption processing after the end of the transmission.

Image data stored in the memory is sent to the destination facsimile apparatus in response to its retrieval request and another retrieval request becomes acceptable through the operator interruption processing after the end of the transmission. Another request for image data retrieval can be therefore accepted without disconnecting the line if the operator interruption processing is carried out after the end of the transmission. As a result, it is possible for a destination facsimile apparatus at a distant place to successively retrieve image data related to image data which has transmitted from the facsimile apparatus.

In accordance with another aspect of the present invention, the facsimile apparatus includes an image data input device for inputting image data, an input data memory for sequentially storing input image data, a transmitter for transmitting the image data of the memory to a line in response to a retrieval request signal from a destination facsimile apparatus and a controller for controlling the transmitter to be ready for receiving the retrieval request through an operator interruption processing after the end of the transmission.

Since image data stored in the memory for sequentially storing data is sent to the destination facsimile apparatus in response to a retrieval request thereof and an additional retrieval request is accepted in accordance with the operator interruption procedure at the end of the transmission, even if desired data is not sequentially stored in the memory, the operator interruption procedure enables the retrieval of image data non-successively stored but related to the previous image data. As a result, it is possible for the facsimile apparatus provided at the distant place to successively retrieve related image data non-successively stored in the memory of storing data sequentially provided in the facsimile apparatus.

Herein, an operator interruption processing is a procedure of transmitting and receiving binary code signals of PRI-EOP (Procedure Interrupt End of Message), PRI-MPS (Procedure Interrupt Multi Page Signal) and PIP (Procedure Interrupt Positive) in place of binary code signals of EOP, MPS and MCF, respectively, at the end of a page transmission in a case where interruption by an operator on the CCITT standard is required, thereby outputting a warning sound of an alarm to the operator to inform him of the necessity of the interruption by the operator.

With reference to FIGS. 7A and 7B, a common procedure of an operator interruption processing will be described in the following two cases. Since this procedure is optional, the operation for this procedure might partly varies depending on a facsimile apparatus.

(1) In a case where a transmission side requests interruption by an operator:

Interruption by an operator is necessary at the transmission side in the following case. That is, when a reception side requests retrieval of image stored in the transmission side apparatus, the reception side sends a retrieval request command of DTMF, whereby the transmission side starts retrieving and transmitting image data. As shown in FIG. 8, when all the image data received in the first communication has been transmitted, the transmission side performs the operator interruption processing. Whether this processing should be carried out at this point or not can be designated by a retrieval request command from the reception side.

In FIG. 8, FAX 1, FAX 2 and FAX 3 represent image data received in the first communication.

When the necessity of the interruption by an operator arises at the transmission side during the transmission of the image data (S41), the transmission side transmits the binary code PRI-EOP (Procedure Interrupt-End of Procedure) signal to the reception side at the end of the image data transmission (S42). The PRI-EOP signal serves to inform the reception side of the transmission side's request for interruption by an operator. Upon receiving the PRI-EOP signal, the reception side transmits a PIP (Procedure Interrupt Positive) signal of a binary code signal as a response signal (S43) and at the same time outputs a warning sound of the alarm to the operator to urge a response. On receiving the PIP signal, the transmission side similarly outputs a warning sound to the operator to urge a response and re-transmits the binary code PRI-EOP signal at the same time (S44). The warning sounds of the both sides are output until both sides respond thereto to enter an on-line state (S45). The warning sound is usually set to be out in about 15-20 sec. Without having a response in this time period, the line is automatically released.

(2) In a case where the reception side requests an interruption by an operator:

The interruption by an operator is necessitated at the reception side when the transmission side does not request an operator interruption processing by using a retrieval request command in the case of the above-described (1) and when the reception side requiring the related data presses a talk request button or the like.

When the reception side needs an interruption by an operator during the image data reception (S51), the reception side finishes the reception of the image data. When receiving the binary code EOP signal (S52), the reception side transmits the binary code PIP signal to the transmission side as a response signal to the EOP signal (S53). At the same time, the reception side outputs the warning sound to the operator to urge a response. The transmission side, on receiving the PIP signal, similarly outputs the warning sound to the operator to urge a response, while re-transmitting the binary code PRI-EOP signal (S54). The warning sounds are output on both sides until both sides respond thereto. The line is rendered on at the time point when both sides respond to each other (S55).

The operator interruption procedure is mostly employed in a common facsimile apparatus having buttons named as a talk request button and the like, which are operated to start the operator interruption processing, thereby outputting warning sounds to both sides to allow them to enter an on-line state after the image data transmission/reception.

The foregoing and other objects, features, aspects and advantages of the present invention will become more apparent from the following detailed description of the present invention when taken in conjunction with the accompanying drawings.

DESCRIPTION OF THE EMBODIMENTS

One embodiment of the present invention will be described with reference to the drawings in the following.

Figure 1:
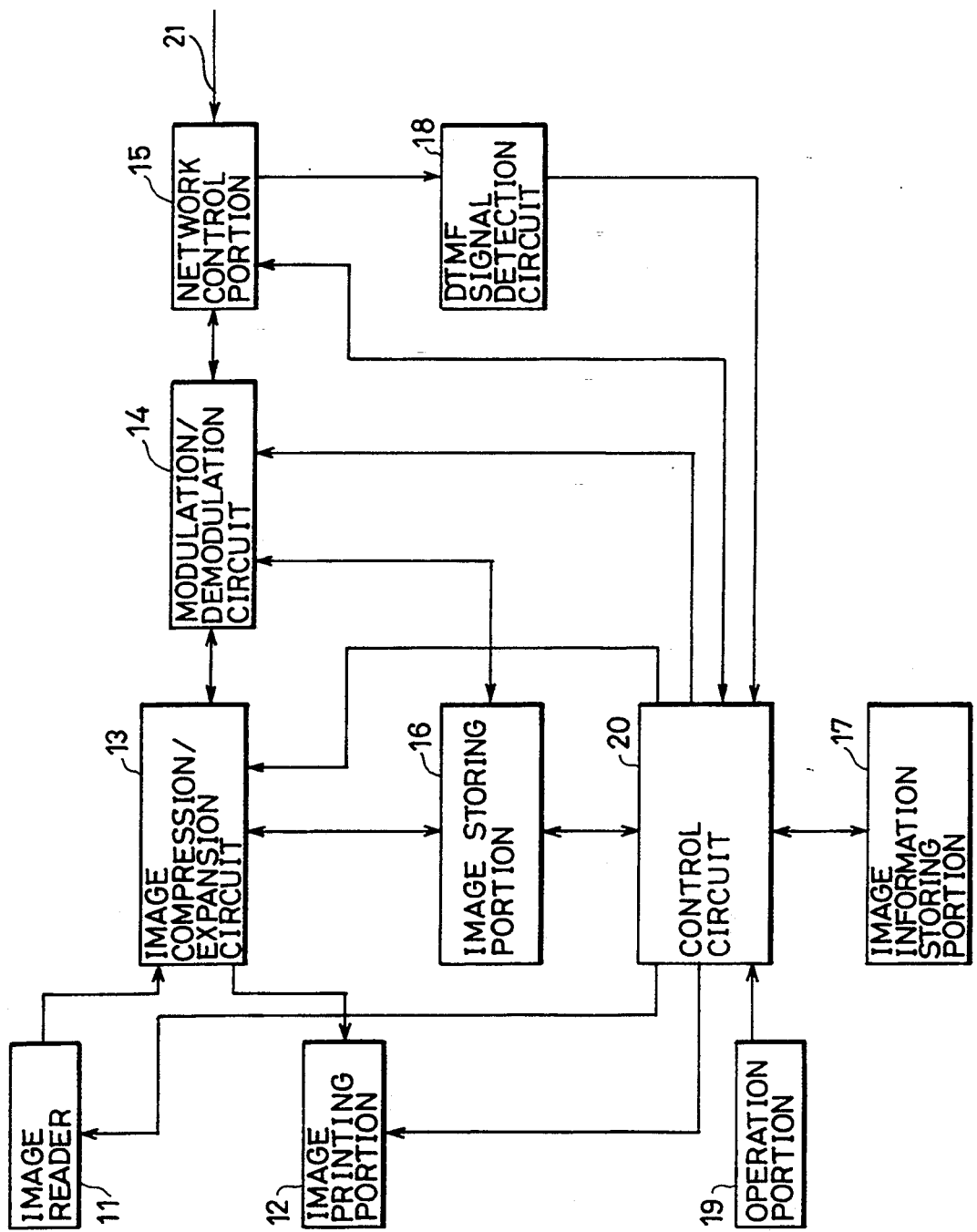
FIG. 1 is a block diagram showing the electrical structure of a facsimile apparatus having an image storing function according to the present invention.

FIG. 1 is a block diagram showing the electrical structure of the facsimile apparatus according to the present invention.

With reference to FIG. 1, an output signal from an image data 11 for reading image and converting the same into a digital signal is sent to an image compression/expansion circuit 13 for compressing the digital image signal on a fixed standard and expanding the received compressed image data or stored compressed image data on a fixed standard to generate a digital image signal for printing. The digital image signal generated by the image compression/expansion circuit 13 is sent to an image printing portion 12 for printing onto recording paper or the like.

The image compression/expansion circuit 13, and a modulation/demodulation circuit 14, and the circuit 13 and an image storing portion 16 send signals to each other bi-directionally. The modulation/demodulation circuit 14 and a network control circuit 15 connected to a telephone line 21, and the circuit 14 and the image storing portion 16 send signals to each other bi-directionally.

The modulation/demodulation circuit 14 modulates the image data compressed by the image compression/expansion circuit 13 and the image data stored in the image storing portion 16 into an analog signal to be transmitted to the telephone line 21 and demodulates the analog signal received through the telephone line 21 into digital data.

The network control circuit 15 holds and disconnects the telephone line 21, detects calling and call incoming and couples signals between the telephone line 21 and the modulation/demodulation circuit 14.

The image storing portion 16 stores compressed image data of the read image generated by the image compression/expansion circuit 13 and the received compressed image data demodulated by the modulation/demodulation circuit 14.

The image storing portion 16 and a control circuit 20 send signals to each other bi-directionally and the control circuit 20 and an image information storing portion 17 send signals to each other bi-directionally.

The image information storing portion 17 stores information such as storage size and a storage position and of each image data stored in the image storing portion 16.

The control circuit 20 for controlling a signal flow at each portion of the facsimile apparatus and a procedure for controlling the flow, receives the output of an operation portion 19 for facsimile transmission/reception, making/receiving call and setting various operations and transmits corresponding control signals to the image reader 11, the image printing portion 12, the image compression/expansion circuit 13, the modulation/demodulation circuit 14 and the network control circuit 15. The network control circuit 15 and the control circuit 20 send signals to each other bi-directionally in order to receive such a signal as indicative of detection of call incoming from the network control circuit 15.

The DTMF signal as the retrieval request signal sent from the destination facsimile apparatus through the telephone line 21 is applied to a DTMF signal detection circuit 18 through the network control circuit 15. The output of the DTMF signal detection circuit 18 indicative of the detection of the DTMF signal is applied to the control circuit 20.

Figure 2:
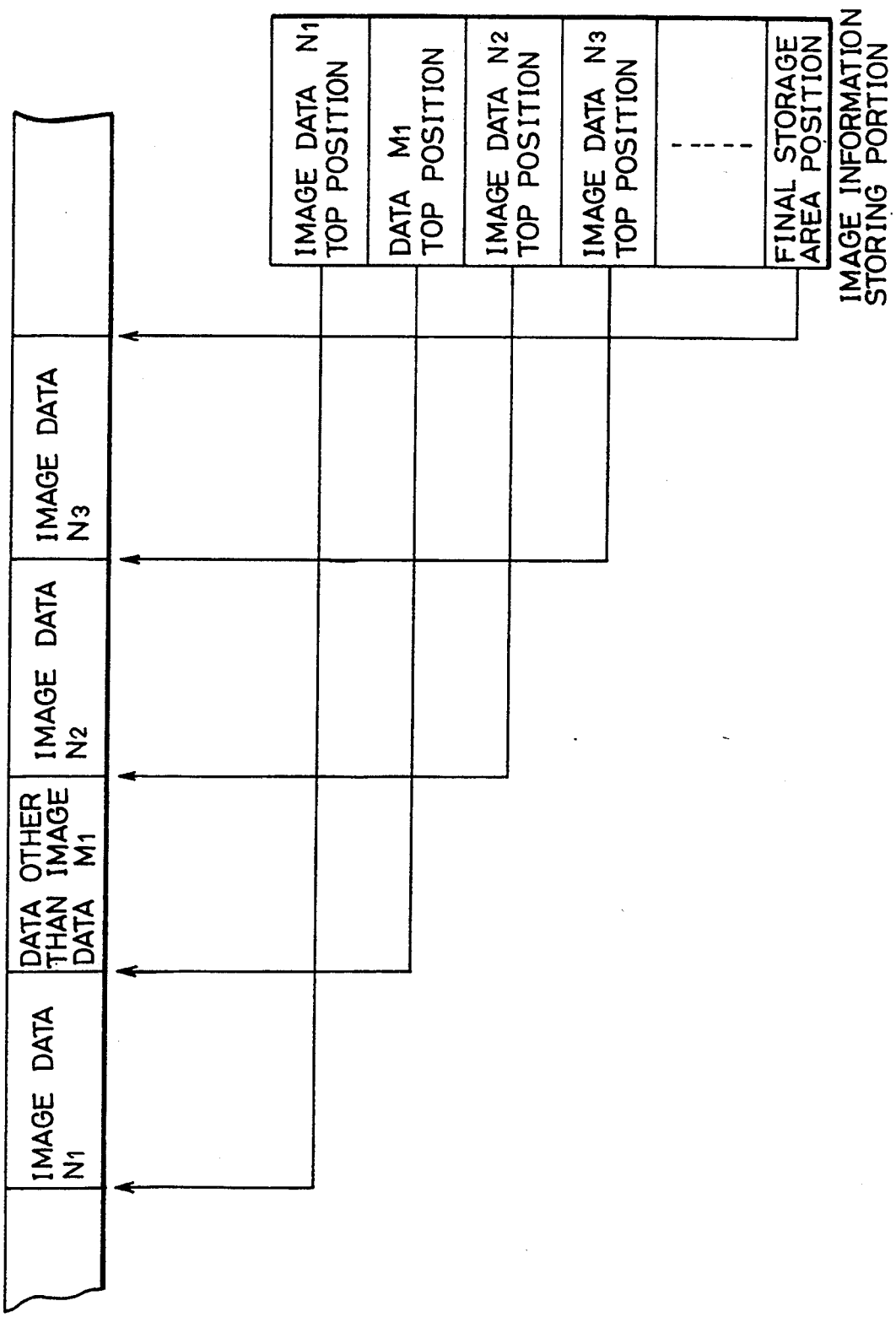
FIG. 2 is a diagram showing the internal arrangement of an image storing portion and an image information storing portion.

The image storing portion 16 comprises a sequential storage medium, the storage area of which includes storage areas N1, N2, N3 . . . for image data and storage areas M1 . . . for the data other than the image data (for example, sound etc.) as shown in FIG. 2. The image information storing portion 17 stores top addresses (tape counter values in a case of a tape or the like as the storage medium) indicative of the top positions of the respective storage areas N1, N2, N3 . . . , M1 . . . and data indicative of the type of the stored image data. The image information storing portion 17 also stores data indicative of the final storage data position. For storing new image data or data other than the image data, data storing is started from the final storage area position, which is followed by setting the final storage area position as the top position of the storage area and setting the storage position at the time of the end of the storing as a new final storage area position. For retrieving the image data, the storage medium is moved to the top position of the storage area corresponding to the page from which the data is retrieved, to sequentially retrieve the image data from that position. Reading of the page is finished when the code indicative of the end of the page is read.

Figure 3:
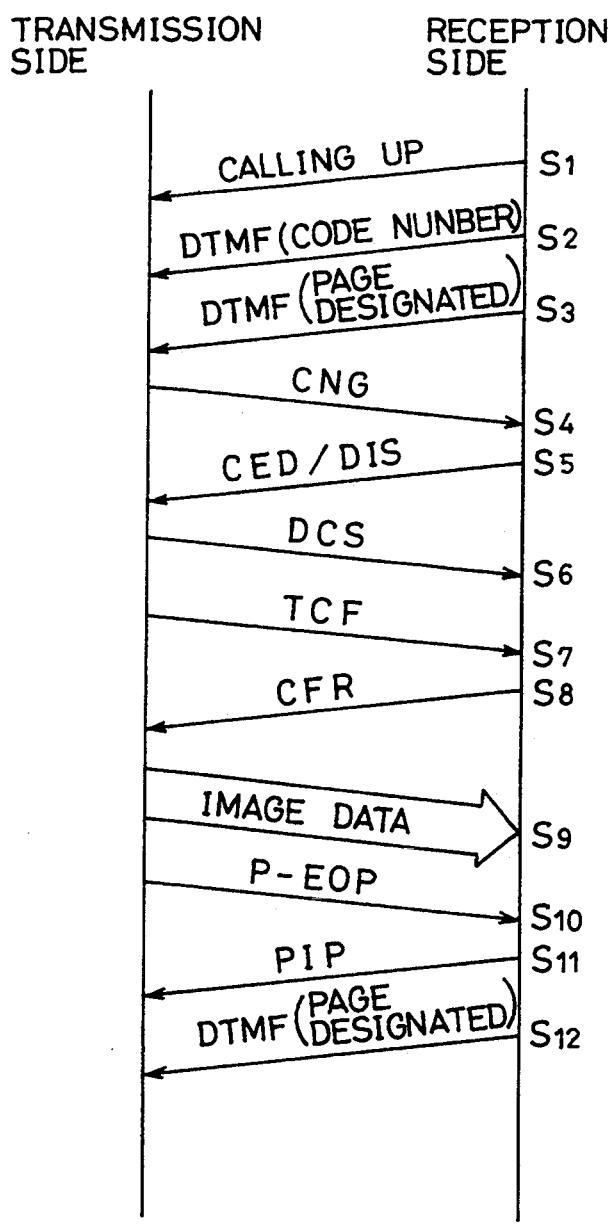
FIG. 3 is a diagram showing the procedure of the communication between a main facsimile apparatus and an reception side facsimile apparatus.

Operation of the facsimile apparatus having the above-described image storing function will be described in the following two cases: (1) for storing received, facsimile image data in the image storing portion 16 and (2) the other for retrieving the image data stored in the image storing portion 16 and printing the same by the facsimile apparatus at a distant place. FIG. 3 is a diagram showing the procedure for sending-/receiving signals between the main facsimile apparatus and the destination facsimile apparatus in the case of (2). The procedure diagram of FIG. 3 will be referred to in the description of (2) when necessary.

(1) In a case of storage of received facsimile image data in the image storing portion 16.

A calling signal from the destination facsimile apparatus through the telephone line 21 is detected by the network control circuit 15. The network control circuit 15 sends the calling detection signal to the control circuit 20. The control circuit 20 controls the network control circuit 15 to connect the telephone line 21 in response to the calling detection signal and at the same time, controls the modulation/demodulation circuit 14 to send and receive the control signal to and from the destination facsimile apparatus following the facsimile communication procedure, thereby receiving transmitted image data. The received image data, after being demodulated into a digital signal by the modulation/-demodulation circuit 14, is sent to the image storing portion 16 wherein the data is stored in a predetermined image data storing area (for example, in N1). Then, the reception of the image data from the destination facsimile apparatus is completed to finish the sending and reception of the control signals, whereby the network control circuit 15 releases the telephone line 21.

The following is an operation performed by the reception side facsimile apparatus for retrieving the image data thus stored in the image storing portion 16. That is, press of the retrieval start button (not shown) of the operation portion 19 activates the control circuit 20 to move the storage medium as the image storing portion 16 to the top position of the image data stored in the image information storing portion 17. The image data is read out, which is sent to the image compression/expansion circuit 13. The image compression/expansion circuit 13 expands the read image data to restore the data into the image data before being compressed, which restored image data is applied to the image printing portion 12. The image printing portion 12 sequentially prints the image data sent from the image compression-/expansion circuit 13 on printing paper. Image data of each page is read and printed following the same procedure so that for the reading of the image data of the first page as described above. The operation is completed after finishing the reading and printing of all the pages.

(2) In a case where image data stored in the image storing portion 16 of the transmission side apparatus is retrieved and printed by the facsimile apparatus at a distant place.

The reception side facsimile apparatus at a distant place calls up the transmission side facsimile apparatus by dialing (S1). The network control circuit 15 detects the call to send the call detection signal to the control circuit 20. Similarly to the above-described facsimile reception, the control circuit 20 controls the network control circuit 15 to connect the telephone line 21 in response to the call detection signal. Thereafter, the destination facsimile apparatus at a distant place sends a previously registered code number for facsimile retrieval by means of the DTMF signal (S2). The DTMF signal detection circuit 18 detects the DTMF signal to convert the same into digital data which is applied to the control circuit 20. The control circuit 20 collates the code number with the code numbers internally stored in the control circuit 20. With the code numbers matching to each other, the transmission Bide receives the DTMF signal as a request for retrieving a designated page transmitted from the destination facsimile apparatus (S3) to control the modulation/demodulation circuit 14 to send the CNG signal indicative of the start of the transmission to the destination facsimile apparatus (S4). The destination facsimile apparatus, on receiving the CNG signal, starts the procedure of facsimile reception to send the CED/DIS signal as a control signal to the main facsimile apparatus (S5). The modulation/-demodulation circuit 14 of the main facsimile apparatus, on receiving the control signal, sends and receives the control signals in accordance with the facsimile communication procedure (S6, S7, S8) and reads the image data of the designated page from the image storing portion 16 based on the data stored in the image information storing portion 17 to modulate the image data, which modulated data is transmitted to the destination facsimile apparatus (S9). Then, after finishing the image data transmission of the designated page, the operator interruption processing is executed by sending and receiving the control signals in accordance with the facsimile communication procedure (S10).

Figure 8:
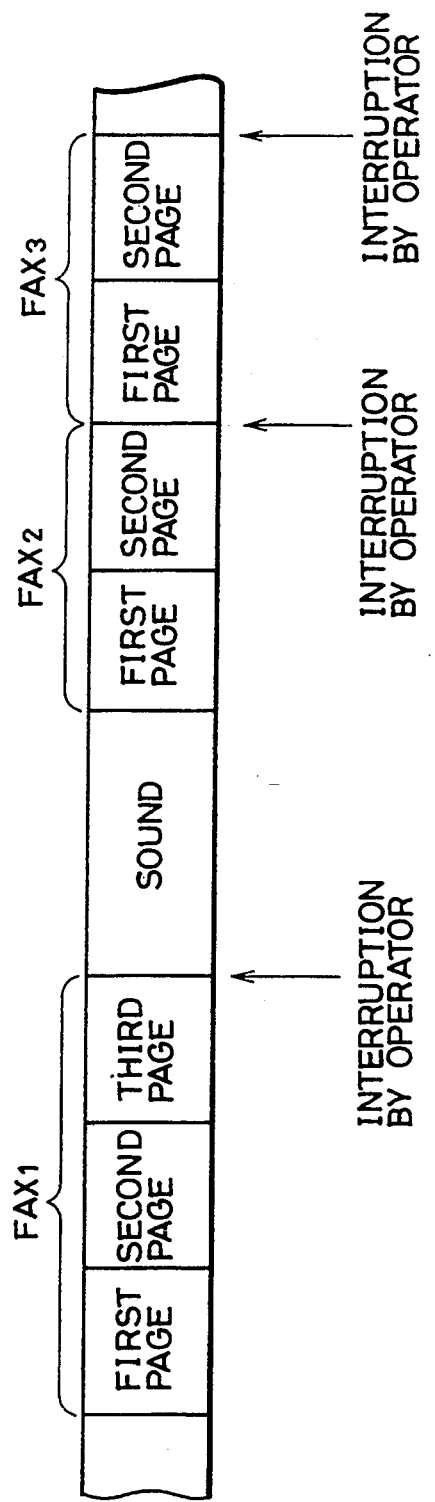
FIG. 8 is a schematic diagram showing the state of the image storing portion storing image data through a plurality of communication.

According to the present embodiment, the operator interruption processing is performed at the end of the transmission of all the pages of the image data received at the first communication as shown in FIG. 8. A DTMF signal as a designated page retrieving request or a DTMF signal indicative of the end of the procedure transmitted by the reception side (destination) facsimile apparatus in response to the operator interruption processing (S12), is detected by the DTMF signal detection circuit 18. The circuit converts the signal into digital data which is applied to the control circuit 20. The control circuit 20 transmits a designated page in response to the DTMF signal as a designated page retrieving request following the above-described procedure.

Description will be given by taking FIG. 8 as an example. After transmitting the third page of FAX 1, the transmission side facsimile apparatus starts the operator interruption processing. In response thereto, the reception side sends the DTMF signal as a request for retrieving the first page of FAX 2 when the operator at the reception side needs the image of FAX 2. When the operator does not require the image of FAX 2, the reception side apparatus transmits the DTMF signal indicative of the end of the procedure. In addition, the control circuit 20 terminates a series of operations in response to the DTMF signal indicative of the end of the procedure.

In place of the operator interruption processing, it is possible that the transmission side facsimile apparatus sends a binary code signal of EOP indicative of the end of the transmission of the image data at step S10 to proceed to the step S12 when the reception side facsimile apparatus transmits a binary code signal of PIP indicative of the operator interruption procedure in response to the binary code signal of EOP (step S11). When a request is received at step S3 for the retrieval of image data received through a plurality of communication (for example, FAX 1 and FAX 2 of FIG. 8), it is possible to proceed again to the processing at step S4 after retrieving the image data to be subsequently transmitted after the procedures from step S4 to step S11.

The operation of the facsimile apparatus at a distant place as a retrieval (reception) side will be described in the following. The retrieval side facsimile apparatus having the same electrical structure as the circuit structure of the main facsimile apparatus shown in FIG. 1, will be described by using the same reference numerals when necessary.

Figure 4:
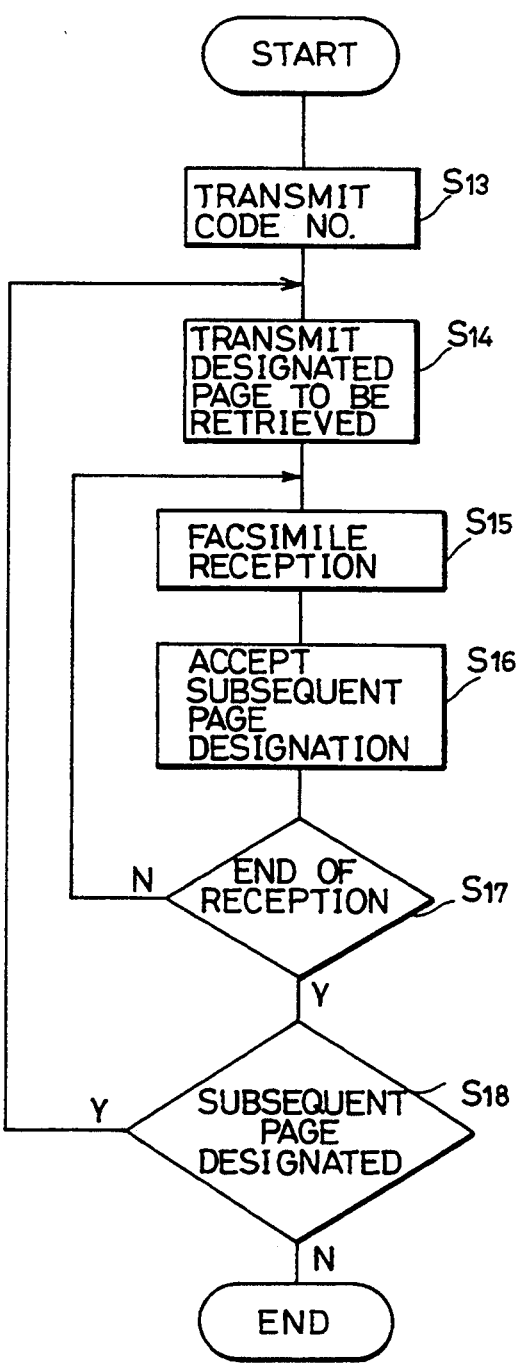
FIG. 4 is a flow chart of the reception side facsimile apparatus.
Figure 5:
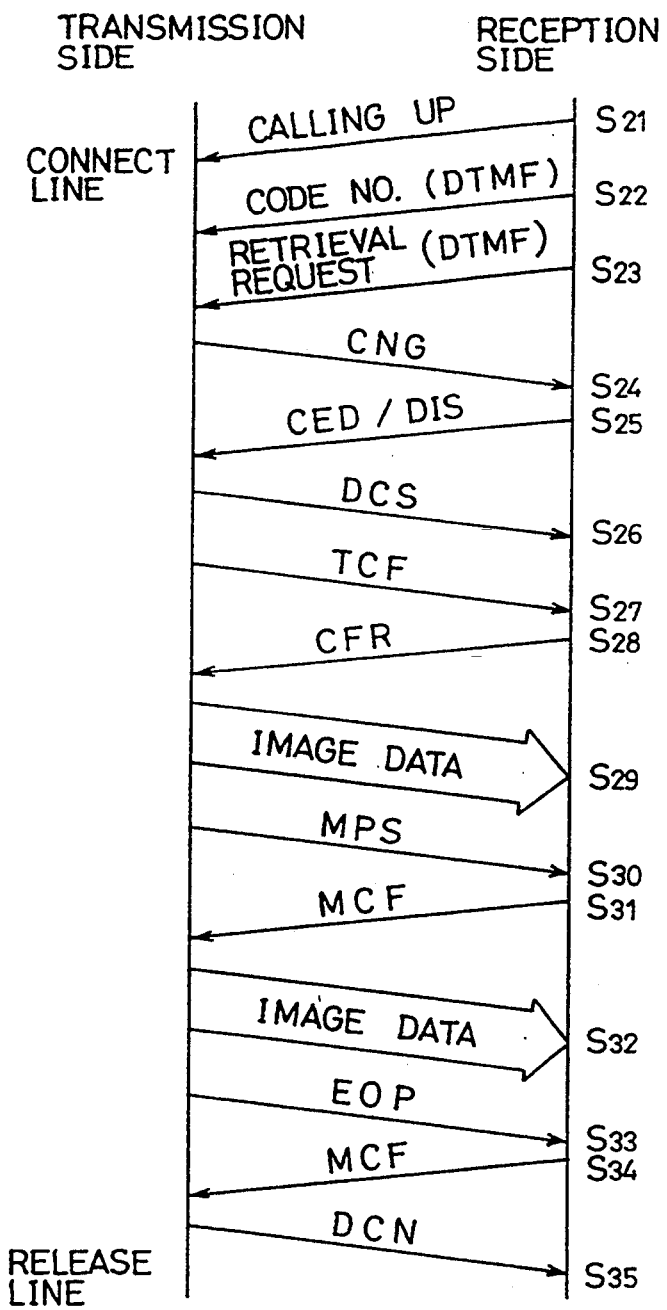
FIG. 5 is a diagram showing the procedure of common facsimile communication.
Figure 6:
FIG. 6 is a diagram showing the storage system of the storage medium of the facsimile apparatus having the image storing function.
Figure 7B:
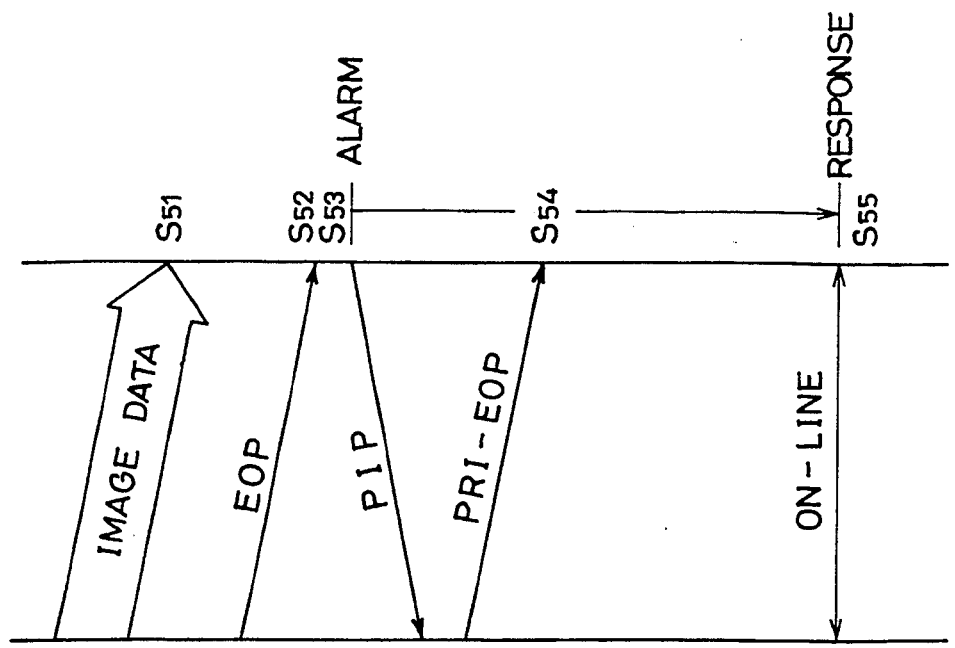
FIGS. 7A and 7B are diagrams showing the procedure of a common operator interruption processing.
Figure 7A:
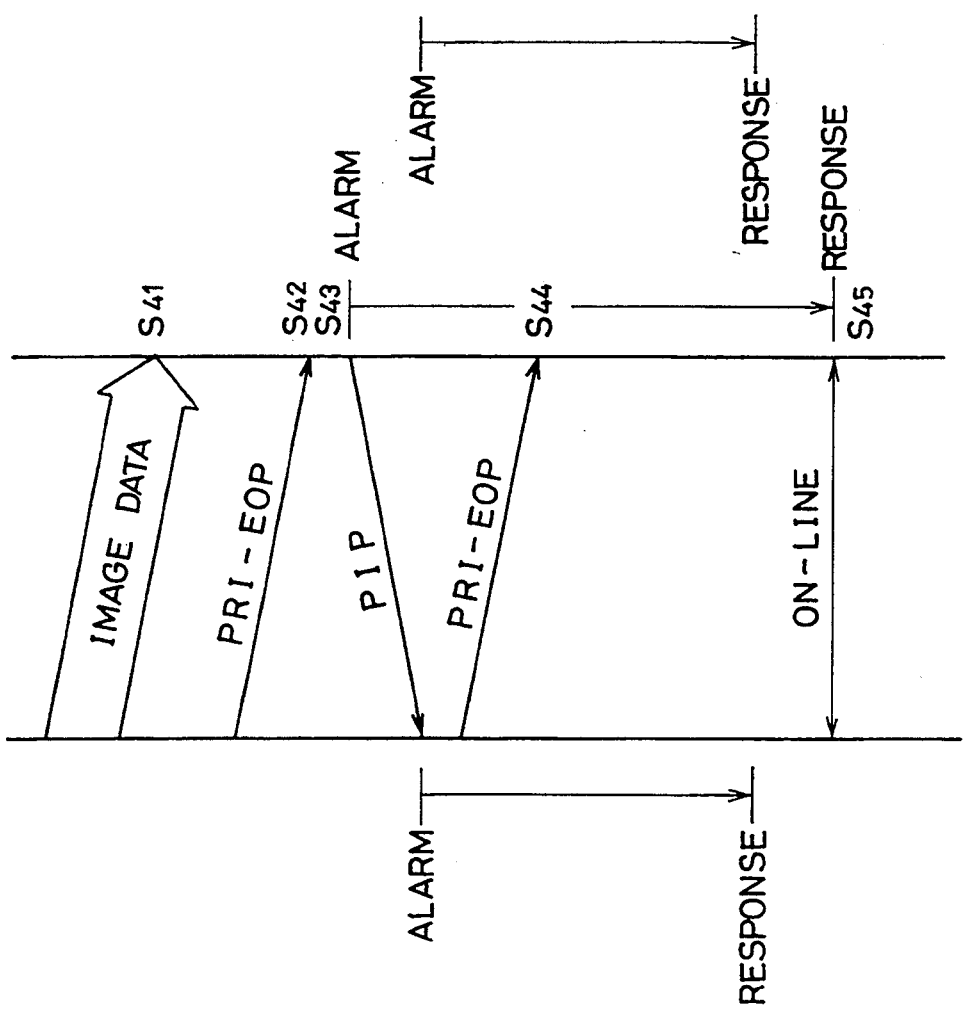

In the retrieval side facsimile apparatus, the DTMF signal necessary at S2, S3 and S12 shown in FIG. 3 is input by operating the operation portion 19. The DTMF signal is generated in the network control circuit 15 and sent to the telephone line 21. As a result, the image data stored in the image storing portion 16 of the above-described transmission side facsimile apparatus is retrieved. In this procedure, as shown in FIG. 3, the control shown in FIG. 4 is performed in the control circuit 20.

That is, the reception side sends the telephone number of the transmission side facsimile apparatus from which the data is retrieved, to call up the transmission side apparatus (S1 of FIG. 3). Thereafter, the reception side sends the code number for facsimile retrieval as a DTMF signal at step S13. Subsequently at step S14, the DTMF signal indicative of a designated page to be retrieved is transmitted (S2 and S3 of FIG. 3). The page to be retrieved is designated by entering ten keys (not shown), for example. Thereafter, at step S15, the reception side receives the image data of the designated page transmitted, and accepts designation of a subsequent page required for retrieving the subsequent page at step S16 following the facsimile communication procedure (S4–S9 of FIG. 3). More specifically, when a dial button (0–9, *, #etc.) of the reception facsimile apparatus is pressed during the retrieval by the reception side facsimile apparatus (during the facsimile reception procedure), the input is internally stored (the input corresponding to designation of the subsequent page) and when the subsequent page is designated at S18, such procedure interrupting processing as at S53 and S54 is carried out to transmit the designated page to be retrieved as DTMF again at S14, thereby proceeding to reception. The end of the reception of the page to be retrieved is verified at step S17. If the reception is under way, the procedure returns to step S14 to continue the reception. On the other hand, when the reception is terminated at step S17 (S10–S11 of FIG. 3), the operation proceeds to step S18 to verify the acceptance of the designation of a subsequent page at step S16. When accepted, the operation returns to step S14 to transmit the DTMF signal indicative of the page designated for retrieval, thereby performing the same facsimile reception as described above. When designation of the subsequent stage is not accepted at step S18, the retrieval is terminated to release the line.

If the retrieval of a plurality of designated pages is requested at step S14, it is possible to proceed to step S15 after finishing the reception at step S17. This operation enables communication to be continued without releasing the line while the main facsimile apparatus searches the image data to be retrieved.

The above-described embodiment employs a storage medium for sequentially storing data. The present invention is not limited thereto and is applicable to a storage medium for storing data at random. In such a case as using a memory or a hard disk as a medium, the apparatus according to the present invention allows another retrieval to be performed when the retrieved image includes error and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:
    image data inputting means for inputting a plurality of portions of related image date,
    input data storing means for storing said plurality of portions of related input image data and also non-image data,
    retrieving means for retrieving at least one of the plurality of portions of related image data stored in said storing means, in response to a retrieval request signal from a destination facsimile apparatus,
    transmitting means for transmitting said at least one of the plurality of portions of the related image data retrieved by said retrieving means;
    controlling means for controlling said transmitting means to be ready again for accepting a retrieval request signal after an operator interruption process which is performed after transmission of said at least one of the plurality of portions of related image data; and
    said transmitting means transmitting remaining data portions without a series of operation signals exchanged with said destination facsimile apparatus in response to retrieval request signals therefrom after said operator interruption process.

2. The facsimile apparatus according to claim 1, wherein said operator interruption processing is carried out by a transmission side facsimile apparatus.

3. The facsimile apparatus according to claim 1, wherein said operator interruption processing is carried out by said destination facsimile apparatus.

4. The facsimile apparatus according to claim 1, wherein
said facsimile apparatus is a first facsimile apparatus, said first facsimile apparatus communicating with a second facsimile apparatus different from said first facsimile apparatus at a reception side,
said second facsimile apparatus including:
retrieval request outputting means for outputting said retrieval request, and
receiving means for receiving said image data, and
controlling means for controlling said second facsimile apparatus to again output said retrieval request signal when said retrieval request outputting means requests retrieval during said reception.

5. The facsimile apparatus according to claim 1, wherein said retrieval request signal includes a signal for requesting retrieval of a plurality of communication records received by said transmission side facsimile apparatus.

6. The facsimile apparatus according to claim 5, wherein transmission of said image data in response to said retrieval request is performed through a plurality of said operator interruption processings at the request for retrieving said plurality of communication records.

7. A facsimile apparatus comprising:
image data inputting means for inputting a plurality of portions of image data received through facsimile communication by means of a network or image data read by an image reader,
input data storing means for sequentially storing said plurality of portions of input image data,
transmitting means for transmitting at least one of the plurality of portions of the image data in said storing means to a line in response to a retrieval request signal of a destination facsimile apparatus, and
controlling means for controlling said transmitting means to be again ready for accepting a retrieval request signal through an operator interruption process after finishing transmission of a portion of said image data.

8. A facsimile system by which data transfer is performed between a first facsimile apparatus and a second facsimile apparatus, comprising:
said first facsimile apparatus that includes:
(a) retrieval request signal outputting means for outputting retrieval request signals to said second facsimile apparatus, and
(b) receiving means for receiving a transmission signal from said second facsimile apparatus, and
said second facsimile apparatus includes:
(c) storing means for storing image data received through facsimile communication by means of a network or image data read by an image reader,
(d) retrieving means for retrieving a first portion of said image data in said storing means in response to a first retrieval request signal from said first facsimile apparatus,
(e) transmitting means for transmitting said at least one of the plurality of portions of the related image data retrieved by said retrieving means;
(f) accepting means for accepting a second retrieval request signal after an operator interruption process is performed after finishing the transmission of said first portion of said image data by said transmitting means; and said transmitting means transmitting remaining data portions without a series of operation signals exchanged with said destination facsimile apparatus in response to retrieval request signals therefrom after said operator interruption process.

9. The facsimile apparatus according to claim 1, wherein said plurality of portions of related image data are stored in said storing means non-sequentially.

10. The facsimile apparatus according to claim 1, wherein each of said portion of image data represents separate sheets of information data.

11. A facsimile apparatus comprising;
a transmission facsimile including;
(a) image data inputting means for inputting a plurality of portions of related image data,
(b) input data storing means for storing said input plurality of portions or related image data, said input data storage means also storing non image data in a format located between said plurality of portions of image data,
transmitting means for transmitting at least one of the plurality of portions of related image data stored in said storage means upon receipt of a retrieval request signal from a reception facsimile apparatus, together with a series of operations between said transmission and reception facsimile apparatus;
(d) controlling means for controlling said transmitting means to be ready again for accepting a retrieval request signal from said reception facsimile apparatus after an operator interruption process is performed after the transmission of said at least one of the plurality of portions of related image data without the series of operations signals between said reception and transmission facsimile apparatus.

12. The facsimile apparatus according to claim 11 wherein there are means for performing said operator interruption process at the transmission facsimile apparatus.

13. A facsimile apparatus according to claim 11, wherein there are means for performing said operator interruption process at said reception facsimile apparatus.

14. The facsimile apparatus according to claim 1, wherein said non image data is sound.

15. The facsimile apparatus according to claim 11, wherein said non image data is sound.

16. The facsimile apparatus according to claim 2, wherein said operator interruption processing includes means for transmitting a binary code procedure interrupt-end of procedure;
means for receiving a procedure interrupt positive signal together with an alarm; and
means for outputting an alarm together with a repeat of said binary code.

17. The facsimile apparatus according to claim 3 wherein said operator processing includes means for transmitting a binary code together with a warning alarm and means for receiving a procedure interrupt end of procedure signal.

18. The facsimile apparatus according to claim 1, wherein said operator interruption processing includes means for emitting a binary code procedure interrupt-end of procedure signal while maintaining at least a plurality of distinct facsimile machines in line contact with each other.

* * * * *